(12) United States Patent
Schick

(10) Patent No.: US 6,526,919 B1
(45) Date of Patent: Mar. 4, 2003

(54) SELF-SORTING HOG FACILITY AND METHOD

(76) Inventor: Paul Schick, 3320 Scherer Rd., Kutztown, PA (US) 19530

( * ) Notice: Subject to any disclaimer, the term of this patent is extended or adjusted under 35 U.S.C. 154(b) by 0 days.

(21) Appl. No.: 09/966,952

(22) Filed: Sep. 28, 2001

(51) Int. Cl.⁷ .................................................. A01J 5/00
(52) U.S. Cl. ..................................... 119/840; 119/14.02
(58) Field of Search ........................... 119/14.02, 14.03, 119/14.08, 520, 840, 842

(56) References Cited

U.S. PATENT DOCUMENTS

| | | | | |
|---|---|---|---|---|
| 4,617,876 A | * | 10/1986 | Hayes | |
| 5,183,008 A | * | 2/1993 | Carrano | |
| 5,351,644 A | * | 10/1994 | Everett | |
| 5,579,719 A | * | 12/1996 | Hoff et al. | 119/51.02 |
| 5,628,284 A | * | 5/1997 | Sheen et al. | 119/840 |
| 5,644,643 A | * | 7/1997 | Scofield et al. | 119/840 |
| 5,673,647 A | * | 10/1997 | Pratt | 119/51.02 |
| 5,771,837 A | * | 6/1998 | Van der Lely | 119/14.02 |
| 5,782,199 A | * | 7/1998 | Oosterling | 119/14.02 |
| 6,095,086 A | * | 8/2000 | Aurik et al. | 119/14.02 |
| 6,341,582 B1 | * | 1/2002 | Gompper et al. | 119/840 |

* cited by examiner

Primary Examiner—Thomas Price
(74) Attorney, Agent, or Firm—Charles A. Wilkinson; Clinton H. Wilkinson (57) ABSTRACT

A highly automated hog housing, feeding and sorting system and method comprising a finishing barn partitioned into two separate pens each capable of holding at least 400 hogs in a large open area, with each room having a living area and central shared but divided feeding area, such that through the adjustment of a gating and fencing system enclosing the feeding area, two pens of hogs can be sorted using a single electronic sorting scale, and wherein hogs are made to sort themselves by weight upon passing through the electronic sorting scale, which designates the animals as either light or heavy, and whereafter a diversion gate ushers them either into the regular feeding area with access back to the living area if they are designated as "light," or into a separate holding pen if they are designated as "heavy. A sick pen area at each end of the building, having its own feed and water supply, is also provided.

30 Claims, 6 Drawing Sheets

SELF-SORTING HOG FACILITY AND METHOD

1. FIELD OF THE INVENTION

The present invention pertains to an arrangement for sorting pigs by weight and holding for market shipment, and more particularly to a pen and feeding configuration in "wean to finish", or "finisher", facilities.

2. PRELIMINARY DISCUSSION

In the present practice of raising hogs for commercial use, such hogs are typically housed in large buildings where they are separated into approximately 40 small rectangular pens per room, with each pen holding 25 to 50 animals and having one gate per pen. While the basic concept of dividing a finishing barn into a number of separate pens has been standard practice for decades, the disadvantages of such a pen design are numerous. For example, it is well known that confining hogs in small, overcrowded pens leads to agitation and fighting amongst the animals, as well as contamination from wastes. In addition, each pen usually has its own feeder and waterer, so that caretakers must check each individual pen for an adequate supply of feed and water as well as good health of the hogs, which is very labor intensive and time consuming.

Another drawback occurs in sorting the hogs. At market time, each pen must be checked for hogs that meet market weight. This is usually done by chasing whole pens of hogs down an alleyway and forcing them through a scale. The hogs are then hand-separated, with heavier pigs entering the market truck, and lighter pigs being herded back to their respective pens. This method of sorting hogs by weight is also very time-consuming, and furthermore poses a risk of injury to both humans and animals.

An alternative method of sorting hogs by weight that is sometimes utilized involves estimating weights by sight. However, estimating weights produces very inaccurate results, and can be very costly, since at the marketplace, sort bonuses are awarded for hogs that fall within a specified weight range. Hogs that are not in this range do not receive a bonus, and in fact may be docked in price.

In addition, it is desirable to ship hogs with empty stomachs. Feed in the stomach could be worth up to 50 cents per pound, which cumulatively represents a significant expenditure, particularly for larger finishing facilities. In addition, if the hogs are shipped with full stomachs, a feed disposal problem at the packing plant results. The only way to achieve empty-stomach shipment is to hold market hogs off of feed for 24 hours, which is impossible in a standard system because market weight and light weight animals are mixed throughout each pen.

Also desirable is to water hogs with electrolytes prior to shipping in order to help the animal to retain water and reduce water shrinkage. However, this is impossible in the current practice of raising hogs because it is not cost-effective to feed watered electrolytes to an entire room or pen of market weight, as well as non-market weight, hogs.

Hogs are generally social animals, and, as indicated above, confinement in small pens can lead to stress and agitation. Over time, the hogs become weaker and less healthy. This in turn can effect their eating habits and growth rate. Thus, it has been found that if the hogs are allowed to roam and mingle in a larger environment and are not confined to a small pen, they will be less agitated and kept in a calmer state. In addition, there will be less of a pecking order which inevitably develops in each small pen, since the dominant hogs will not be able to fight every other hog, which inability presumably will lead to fewer overall fights and injuries.

3. DESCRIPTION OF RELATED ART

Numerous methods and arrangements for managing or sorting animals by size, weight or other criteria are known in the prior art. One common sorting method is to herd such animals through a gate wherein upon exiting the gate they can be individually directed to different pens or areas. For example, U.S. Pat. No. 182,688 issued to A. Minor, entitled "Stock Separator," discloses an early gate system for separating livestock wherein two pivotable panels positioned near an entranceway funnel the livestock through a gate one at a time, and wherein a third panel positioned outside the exitway is manually swung from side to side depending on which direction it is desired to push the livestock.

Other arrangements wherein animals are guided through chutes into a desired holding area are also known. U.S. Pat. No. 2,050,527 issued to C. Grabe, entitled "Animal Chute," discloses a chute formed by a pair of parallel stationary fences having two swinging or alternatively positionable fence sections therebetween, so that the fence sections can be manipulated and positioned to channel livestock in a particular direction such as into a certain pen or corral. U.S. Pat. No. 3,545,407 issued to W. T. Moore, entitled "Animal Pen," discloses a pen comprised of a plurality of pivotable outer fence sections surrounding a chute-like passageway, wherein the outer sections can be positioned to direct a herd of animals as desired.

U.S. Pat. No. 4,136,641 issued to H. F. Hoffman, entitled "Livestock Sorting Gate," discloses a three-sided swinging gate pivotally connected in series so that it swings as a unit from side to side, thereby either opening or closing off entrances to opposing pens. U.S. Pat. No. 4,261,297 issued to E. Van Maarion et al., entitled "Animal Processing System and Cutting Gate," discloses another generally triangular swinging gate which can be situated so as to allow entry into or block entrance into various fenced areas. Van Maarion et al., also utilizes simple arcuate swinging gates in combination with the triangular gate to increase the effectiveness and versatility of the triangular gate. U.S. Pat. No. 4,552,096 issued to W. J. Forrest on Nov. 12, 1985, entitled "Sorting Gate Assembly," discloses a pivotable gate for use in a holding pen, which gate can be moved to various positions to corral or sort the animals. While such gates are used to urge or force animals in a particular direction or into a particular pen, the animals are separated by visual inspection rather than by weighing.

Another common sorting arrangement is to provide a doorway or opening through which only animals below a predetermined size can fit. One such arrangement is illustrated in U.S. Pat. No. 1,381,797 issued to H. D. Caspers, entitled "Stock Separator," wherein the distance between a pair of vertical rollers is adjustable so that only hogs smaller than a selected size can fit through such opening. Another example is U.S. Pat. No. 1,788,244 issued to J. E. Larson, entitled "Stock Separator," which discloses a feed house having openings doors adjustable so that while smaller pigs can pass through the doors, larger pigs cannot and therefore eat less. U.S. Pat. 3,072,100 issued to H. E. Dustin, entitled "Animal Sorter," discloses a sorter for selecting and segregating hogs which are ready for market, comprising an adjustable gate wherein smaller hogs can fit through the bars in the gate, while larger animals cannot. Other similar arrangements can be found in U.S. Pat. No. 3,861,359 issued to R. Pals, entitled "Hog Sorter Gate Device," U.S. Pat. No. 3,894,516 issued to M. J. Schaefer, entitled "Animal Sorting Gate," U.S. Pat. No. 4,019,464 issued to T. G. Miller, entitled "Animal Size Sorting and Control Gate" and U.S. Pat. No. 4,572,109 issued to E. T. Nixon, entitled "Animal Separator Gate." While over time such sorter gates divide the animals into groups of larger and smaller size, none of such gate systems represents a significant improvement over merely visually estimating the size of the animals. Such systems simply cannot segregate animals with sufficient accuracy for the packer to receive sort bonuses for meeting packer weight specifications.

Various gates or chutes for sorting animals by weight are also known. U.S. Pat. No. 4,134,366 issued to J. L. Elliot, entitled "Animal Sorter," discloses a sorter wherein the end of a chute is aligned with either a first or second exit depending upon the weight of the animal. If the weight of the animal exceeds the weight of a counterweight, the first exit is opened, while if the weight of the animal is less than the counterweight, the second exit is opened. U.S. Pat. No. 4,138,968 issued to J. L. Ostermann, entitled "Automatic Sorting Device for Livestock," discloses a chute also having a weighing means therein such that the weight of the animal determines which of two passageways is opened.

In U.S. Pat. No. 4,280,448 issued to J. L. Ostermann, entitled "Livestock Sorting Device," animals are individually weighed in a chute and then directed into one of two fenced areas. Ostermann shows a manual method for directing hogs to a particular pen based on weight. To use the sorter, an entrance gate is opened by the operator, allowing an individual hog to enter, with the exit blocked by a second gate. After the weight of the animal is determined, the second gate is opened and the hog is directed to one of the fenced areas by manually manipulating a gate operating arm. One of such areas is designed to hold sorted animals ready for market, while the other area is for animals not ready for market.

U.S. Pat. No. 4,162,682, issued to W. K. Miller, entitled "Pivotal Sectionalized Wall for Hog Raising Enclosure," discloses a gate system for use in hog barns of the conventional type wherein hogs are housed in small individual pen areas, rather than in large open finishing barns. In Miller, sections of the walls of multiple pens can be moved for ventilation or the like using mechanical interconnection.

U.S. Pat. No. 5,878,695 issued to J. F. Gent, entitled "Extendible Hog Gate and Confinement Facility Gate System," discloses a more recent hog pen forming gate, wherein each gate apparently has a stationary portion and a pivotable portion. Such gates allow the sizes of the pens and walkways between the pens to be varied depending on the space required or the number of hogs in a pen.

More recently, electronic identification or sorting systems have become increasingly common. U.S. Pat. No. 5,183,008 issued to J. A. Carrano, entitled "Livestock Sorting System Having Identification Sensor and Gate Mounted Exit Switch," discloses a sorting system which uses a sensor to read electronic identification tags on livestock, which sensor then causes a gate to move to either a first or second position. Carrano uses electronic identification, rather than size, weight, or some other factor to sort the animals. U.S. Pat. No. 5,595,144 issued to U. Löher, entitled "Device for Sorting Animals," discloses another sorter which utilizes electronic sensors to direct animals into a particular area. A first sensor in the passageway identifies the animal, and a second sensor positions the gate. The two sensors are spaced apart so that the device can quickly sense and respond to different animals to be sorted. U.S. Pat. No. 5,979,365 issued to K. Sorraghan et al., entitled "Animal Sorting Module," discloses a passageway for sorting animals which employs cylindrical rollers at the entry and exit points of the passageway. Such rollers are preferably operated by a computer which reacts to sensors on the system to detect particular animals, and which close around the flank of the animal to prevent a following animal from entering the passageway at the same time. Sorraghan et al. presents a solution to the problem of more than one animal trying to squeeze into the passageway at the same time.

U.S. Pat. No. 5,579,719 issued to S. J. Hoff et al., entitled "Method and Means for Quasi Ad-Libitum Feeding for Gestation Sows in Loose Housing," discloses an improved electronic identification and feeding system for gestating sows. Gestating sows are kept in a confined area having a separate feeding area. To enter the feeding area, hungry sows, wearing a computer scanable responder tag, pass through a oneway gate with a scale, wherein the tag number is read by the computer. Once the sow and her weight are identified, the computer determines which feed pen the sow should be directed to, and the gate to such feeding area is opened. If the feeding area is currently full, the sow will be passed back to a confined bedding area. The sorting systems which utilize an electronic sensor to identify individual animals are expensive, and are not usually necessary for sorting hogs that are ready for market from those that are still too light, and in addition none of such references includes a gate system similar to the present system.

U.S. Pat. No. 6,135,055 issued to W. C. Pratt on Oct. 24, 2000, entitled "Cattle Management System and Method," discloses a state-of-the-art, high tech system for monitoring and keeping track of characteristics of each individual animal. As cattle are passed through a chute one at a time, vital statistics are recorded wherein a computer automatically directs the animal either to a shipping pen or a feeding pen. The Pratt system also keeps track of statistics up until and including the slaughter process.

Finally, at least one finishing barn design wherein the hogs are held in a larger communal setting is also known. U.S. Pat. No. 4,442,792 issued to A. C. Nehring, entitled "Hog Finishing Building," discloses a barn arrangement wherein the hogs are not confined to small pens but are allowed to move around and mingle. The feeding area is centrally located, and the floor is slotted to allow waste to fall between the floor boards. Nehring also shows several interior side and end walls, but does not include any type of segregating or weighing devices, or any pivotal fencing arrangements, and is not directed to weighing and sorting the hogs.

The inventor is also aware of a Canadian company, K&L Technical Services, Ltd., that has invented a sorting gate called the "Super Sorter." Such sorter is placed in a common area between a pig barn and feeding area, so that the pigs must pass through the sorter on the way to the feeding area. The sorter then weighs the pigs and directs pigs that have reached market weight to the shipping pen, while light pigs are directed to the feeding pen. While the above sorter is used in an open pig barn similar to the present system, it is not used in combination with a gate system wherein such barn is divided into two open pens which can utilize the same weighing and sorting facilities.

Despite the significant advances in animal sorting and management systems known in the prior art, there is still a need for a more efficient finishing barn design wherein the hogs are not held in a plurality of small pens, but rather are allowed to move around in a larger area, having a centralized feeder and accurate sorting system wherein the animals safely sort themselves by weight into groups ready for market and groups which are not. In addition, there is a need for a gate system wherein two large pens can utilized a central weighing, sorting and feeding area.

OBJECTIVES AND SUMMARY OF THE INVENTION

The present invention solves the objective of minimizing labor by allowing the hogs to sort themselves by weight through a centralized feeder and holding pen layout, and providing a single alleyway through which the hogs are run for market loading.

Other objectives are to provide a method and system aforesaid that:

assures accuracy in sorting hogs by weight in order to achieve sort bonuses without running individual hogs over a scale by hand;

minimizes injury-risk to both animals and humans;

ensures efficiency in all hog-growing operations including feeding, housing, watering, monitoring and sorting;

enables the use of a single electronic sorting scale per two-pen room, allowing the producer to purchase and maintain a minimal amount of equipment for a self-sorting operation;

allows for the holding of a group of marketable hogs in a separate holding area;

allows for a group of marketable hogs to be selectively held off of feed for any amount of time in order to guarantee empty stomach shipment, thus increasing profits and decreasing work at the packing plant;

allows for a group of marketable hogs to be fed watered electrolytes for any amount of time, in order to reduce water shrinkage;

enables loading to be accomplished efficiently and in a reduced amount of time, thus reducing stress on the producer and animal;

enables hogs to be kept in a calmer state during growing due to the presence of less confinement and more area to move and lay out of drafts;

minimizes fighting through the elimination of a dominant hog, thus eliminating a pecking order due to the fact that one hog cannot battle several hundred animals.

To achieve these and other objectives, the building consists of at least one room, capable of housing over 800 head per room in two separate pens, with a single feeding area contained in each pen, centrally located within the building. Waterers are installed in the feeding area, as well as along the holding pen center partition.

The two pens in a room are separated by a fencing and gating system with an electronic sorting scale forming the upper part of the fence, located near the entrance to the feeding areas. A diversion gate forms the central portion of the fence, pivoting from the front end of the scale to one of three fixed fence locations.

The holding area is located in the living area stemming from the lower portion of the feeding area. Under normal growing conditions, the holding area consists of two fixed fences, with the lower fence stemming from the feeding area, parallel to the alleyway wall, and running the majority of the pen length. The second holding area fence travels from the feeding area, approximately down the center of the pen, and to near the opposite end. Waterers are contained in the holding area along the length of the lower fence.

The fencing leaves the option to install two removable gates at the time of sorting for market in order to hold hogs in different sized groups. Another removable gate is also present at the entrance to the feeding area and allows hogs to be diverted onto the scale. The scale is either opened or blocked off by an additional removable gate.

Directing hogs to a "heavy weight" holding pen and "light weight" living area is accomplished through the placement of the aforementioned centrally located diversion gate, as well as a removable and interchangeable gate running from one of two horizontally opposite fixed points produced by extensions on the scale. The gate ends at the beginning of the lower fixed fence.

The feeding area consists of several two-sided horizontal feeder rows, adjoining the area's fence partition on the outermost side and running toward the central pen partition. The lowermost feeder row can be gated into the holding area at market sorting time. In addition, a removable gate can be placed at the entrance to the holding area, excluding the aforementioned feeder row, in order to hold the animals off of feed. Between the feeders are two one-way gates located on the outermost feeding-to-living area partition, and allowing hogs access back to the living area.

The feeding area is partitioned by a rectangular gating/fencing system which runs vertically through the room's center, horizontally along the alleyside room partition, vertically along the feeder's outer edges, and horizontally near the building's outer wall.

A sick pen area is located at the outer end of each pen, each having its own feed and water supply, allowing the producer to segregate sick or lame animals and still maintain the benefits of a large pen environment for the rest of the herd.

All removable free-standing gates are held upright through the use of floor to ceiling telescoping poles at each end.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings the invention may be understood.

A highly automated method and system for housing, feeding and sorting market hogs in large-pen environments is provided. Hogs are made to sort themselves by weight through the use of large environment housing where pigs are grown in open areas of 400 or more animals. Such animals have access to a single central feeding area equipped with both feeders and waterers which can be entered either from the living area and exited through a one-way gate, or by channeling hogs over an electronic sorting scale. The method of entering the feeding area is determined through manipulating a gating and fencing system that encloses the feeding area. When gates are positioned in the second aforementioned configuration, hogs must cross an electronic sorting scale before entering the feeding area, which designates the animals as either light or heavy. Through the use of a diversion gate, their weight causes them to be ushered either into the regular feeding area with the normal one-way access back to the living area if they are designated as "light," or into an alleyway formed by movable gates which leads to a holding pen area, which is adjustable to accommodate three different sized groups of hogs, if they are designated as "heavy." The holding area encompasses a single side of the last row of feeders, and can facilitate the hogs being held off of feed, and given watered electrolytes. The holding pen opens directly into a single alleyway through which hogs can be loaded onto a market truck. Through the adjustment of the gating and fencing system, two pens of hogs can be sorted using a single electronic sorting scale, with the capability of sorting a single pen daily. In addition, a sick pen area is located at each end of the building, having its own feed and water supply.

Figure 1:
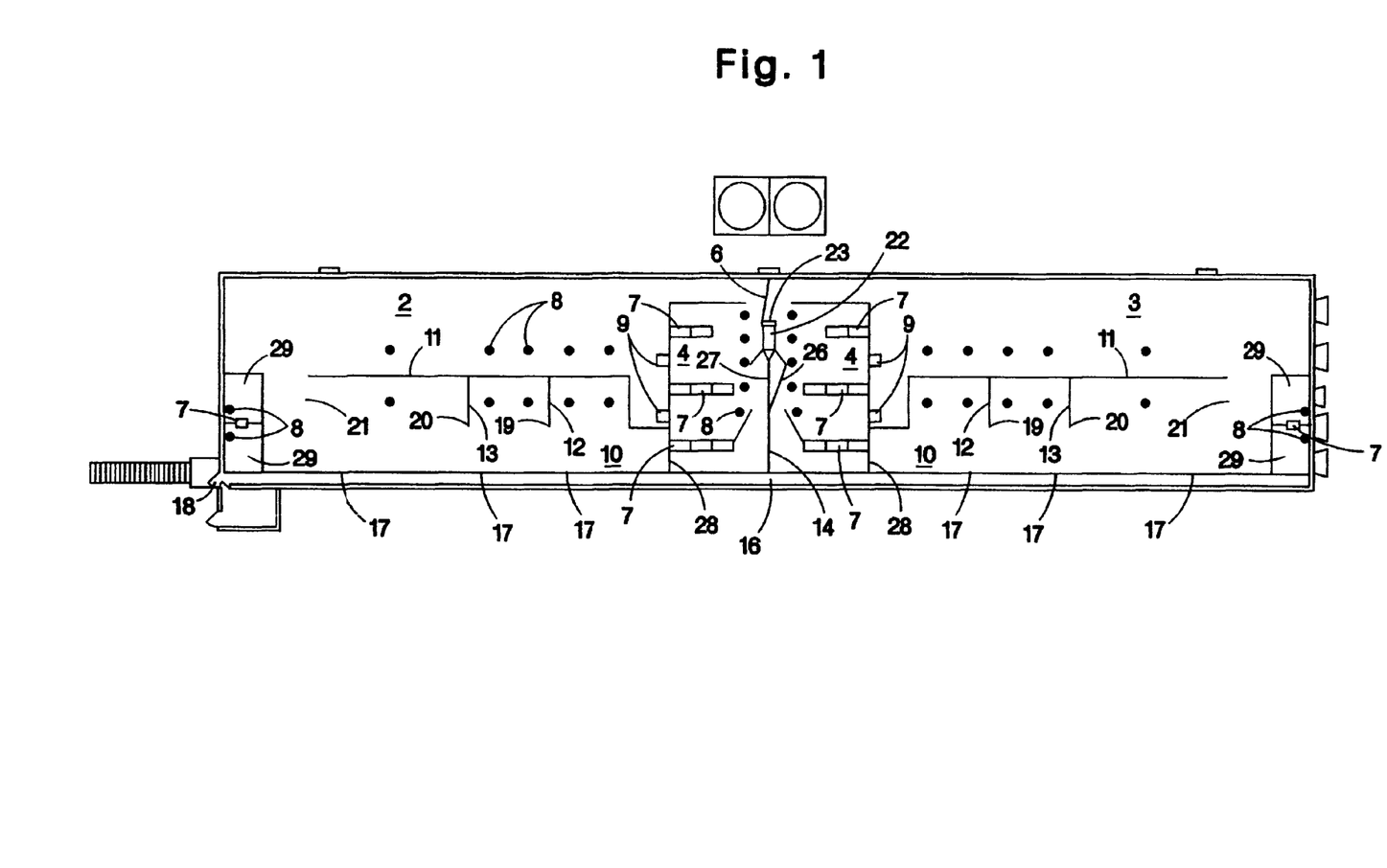
FIG. 1 is an overhead view of an entire one-room self-sorting hog facility under normal growing conditions.

FIGS. 1–6 illustrate a preferred embodiment of an automated method and system for housing, feeding and sorting market hogs. FIG. 1 is an overhead view of an entire single room self-sorting hog facility wherein large pens 2 and 3 make up the facility under normal growing conditions. Contained within pens 2 and 3 are feeding areas 4 which, during normal growing conditions, are entered through the removal of gate 5 (shown in FIGS. 3 and 4). The floor of pens 2 and 3 and feeding areas 4 are preferably at least partially slatted so that waste and excrement passes into a pit or deposition area below the floor.

Feeding areas 4 are made separate by stationary fence 14, scale 22, removable gate 26 or 27, and pivoting gate 6. Each feeding area 4 contains three rows of feeders 7, which can all be accessed during normal growing conditions on both sides, along with waterers 8, which are also spaced throughout living areas 2 and 3. Waterers 8 can be of any known type such as an adjustable hog nipple, product number 1000-0743 manufactured by Edstrom Industries of Waterford, Wis., or other hog fountain. From feeding areas 4, hogs can file back into pen areas 2 and 3 through one-way gates 9.

During normal growing conditions, electronic sorting scale 22 is made inaccessible through the placement of gates 6 and 23, with their removal giving hogs free access to the scale. Scale 22 should be capable of automatically and continuously weighing the hogs, such as the "Super Sorter" scale manufactured by K&L Technical Services of Alberta, Canada, although other gated animal weighing device wherein the animal can be sorted into a different holding area depending upon its actual weight can be used.

Also referenced in FIG. 1, are holding areas 10, which are in an open position under normal growing conditions, allowing hogs to roam freely throughout living, or pen, areas 2 and 3. Horizontal fence 11 is stationary, with gates 12 and 13 being stored in one of three possible positions, as shown below. The gates used with the invention may be of many types, but are preferably made from aluminum and have sufficiently narrowly spaced bars to prevent the pigs from getting their heads stuck between the bars. Each of the removable/interchangeable gates used in the gating system is preferably held upright through the use of floor to ceiling telescoping poles. Sick pen areas 29 are available for use by sick or lame animals, each being supplied by waterers 8 and feeders 7.

Figure 2:
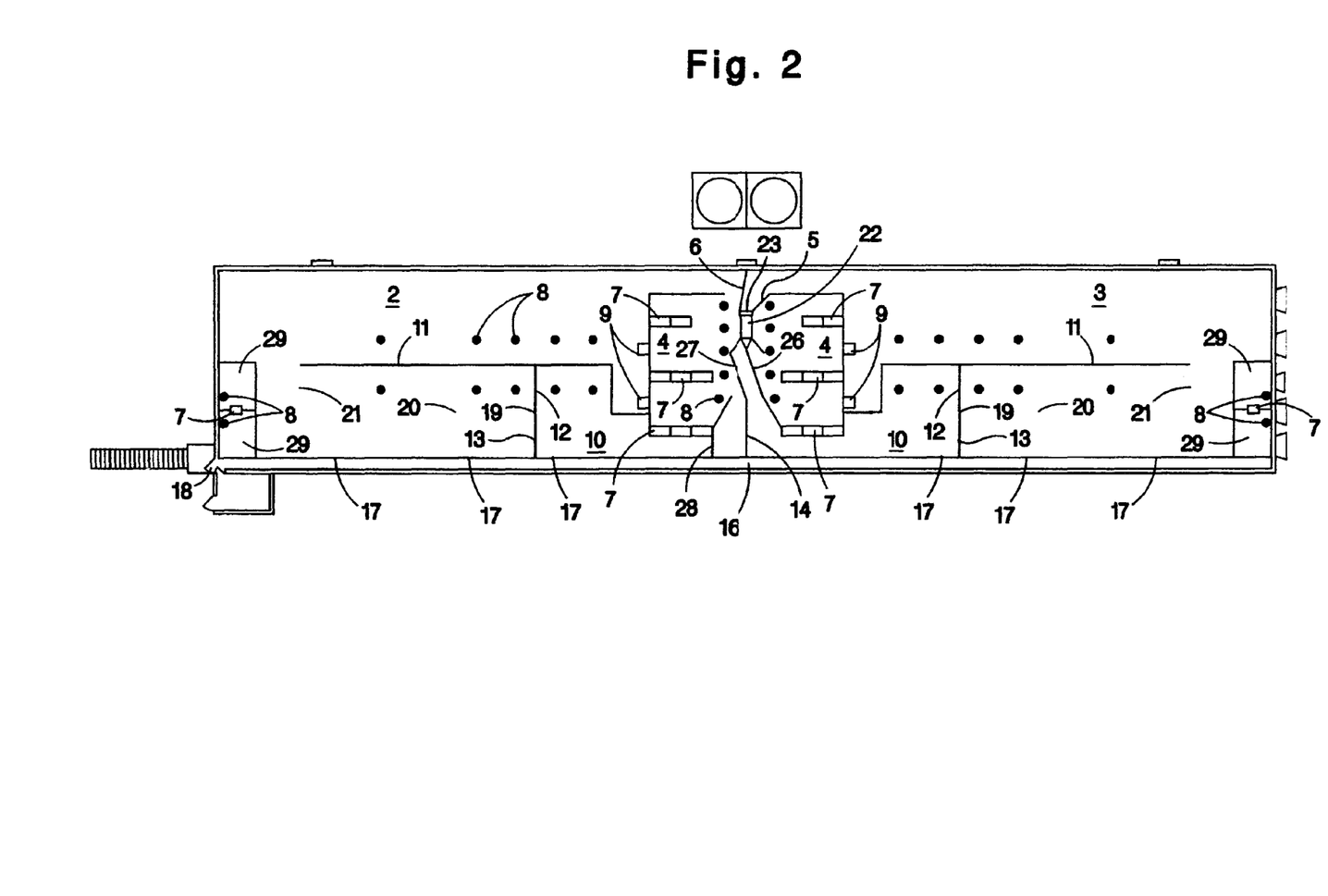
FIG. 2 is an overhead view of an entire one-room self-sorting hog facility as configured during hog sorting of the right side pen, and market-holding of the left side pen.

FIG. 2 illustrates the single-room self-sorting hog facility shown in FIG. 1 configured during hog-sorting in pen 3 and market holding in pen 2.

Figure 3:
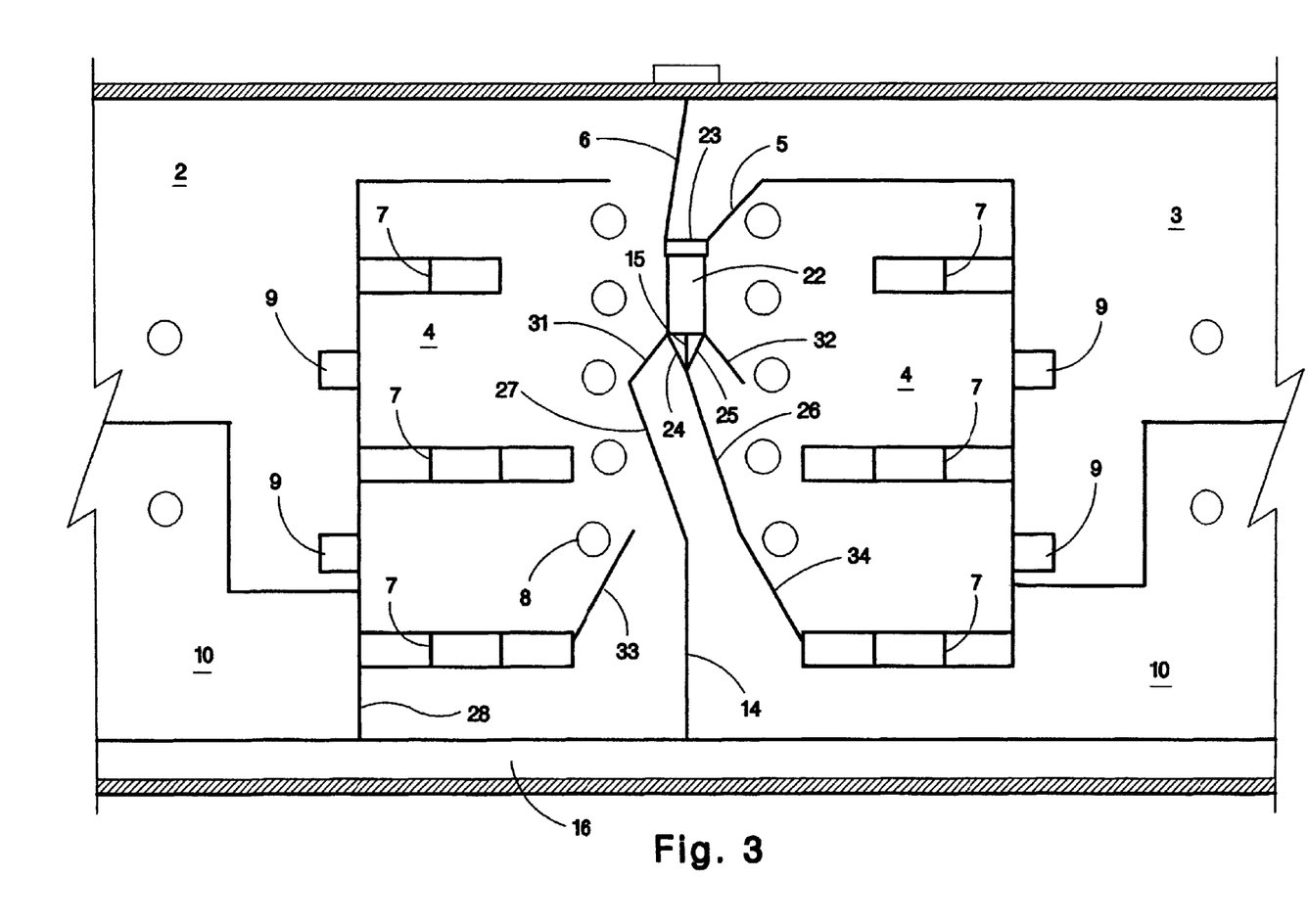
FIG. 3 is an overhead close up view of the feeding areas during hog sorting of the right side pen in a one-room self-sorting hog facility.

As shown in FIG. 2, the holding area of pen 3 is reconfigured during hog sorting, with gates 12 and 13 forming the pen in either position 19, 20 or 21, for a quarter, half or whole truckload sort, respectively. Pen 2 is configured for market holding, with gate 28 containing the sorted market hogs in the holding area 10, allowing them access to one feeder row side 7. Waterers 8, located along stationary wall 11, provide water or, additionally, electrolytes to hogs in the holding pen. FIG. 3 depicts a close up view of the reconfigured feeding areas during the sorting of pen 3. Gates 5 and 6 are positioned so that the hogs can only enter feeding area 4 of pen 3 by crossing electronic sorting scale 22. At such time gate 23, positioned over the front of scale 22 is removed. Gate 26 is secured at one end to the rear tip of scale 22 and at the other end to gate 34 extending from feeder 7, thereby effectively blocking access to the majority of feeding area 4. Gate 27 is simultaneously secured at one end to gate 31 and at the other end to gate 14.

Upon single file entrance onto scale 22, hogs are weighed and determined to be either "heavy" or "light." If designated as "heavy," gate 15 pivots, to allow access to opening 24, forcing the animal to travel down the corridor formed by the placement of gates 26 and 27, and into holding area 10, which has previously been adjusted to hold hogs in position 19, 20 or 21, as shown in FIG. 2. These hogs now have access to one side of a feeder row 7 and one row of waterers 8, allowing the producer complete and exclusive control over this "heavy" group of market hogs' diet. Such hogs in holding area 10 can also be held off of feed completely through the placement of gate 28 at the entrance to holding area 10, as shown between the feeding and holding areas of pen 2 in FIG. 3.

If a hog is designated as "light" upon entrance to scale 22, referenced in FIG. 3, gate 15 pivots, to allow access to opening 25 and back into the normal feeding area 4, minus the holding pen feeder row side. The hog can now exit via one-way gates 9, and continue with normal growing, feeding and watering habits until being deemed "heavy" during a future sorting.

Figure 4:
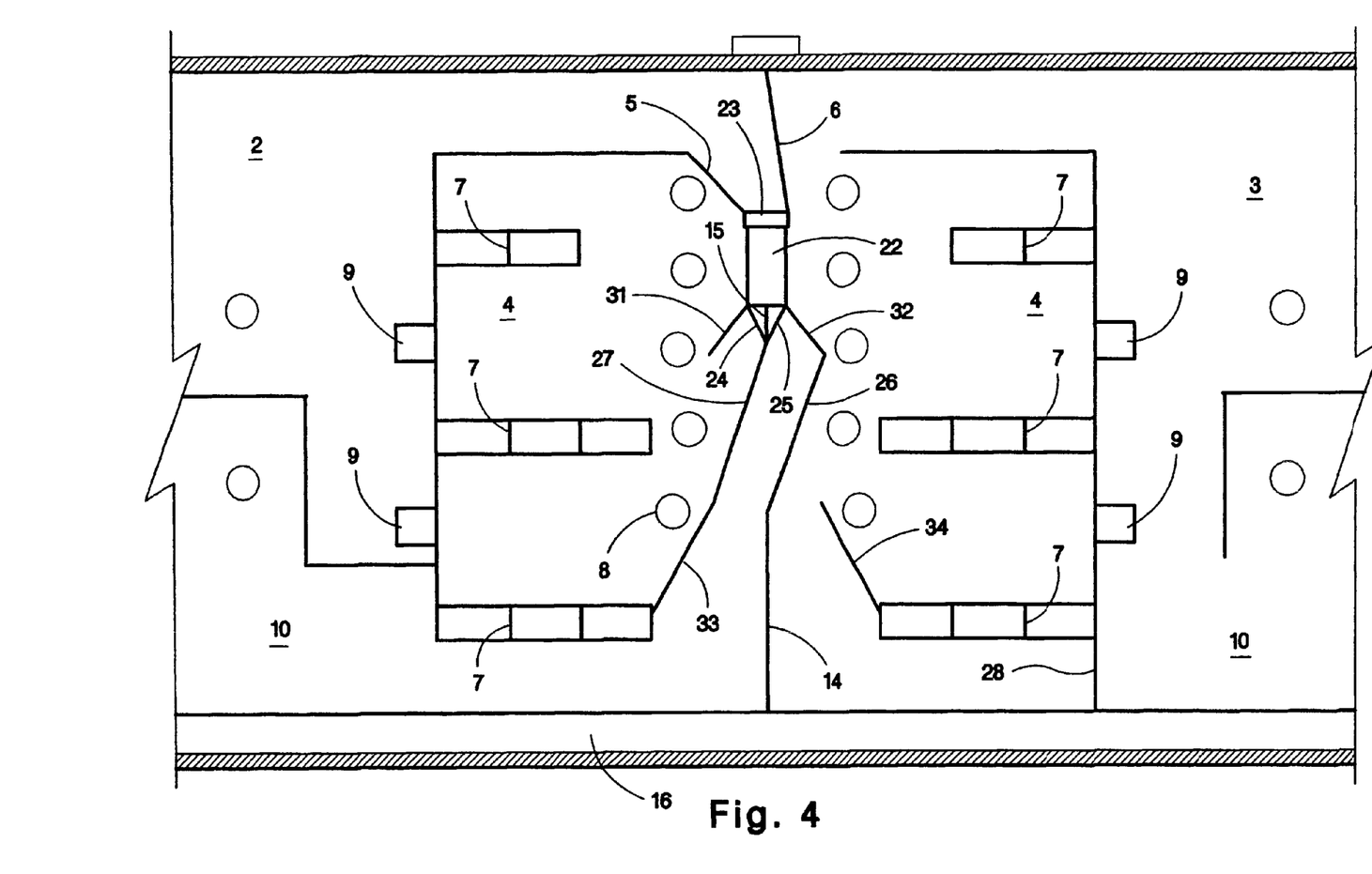
FIG. 4 is an overhead close up view of the feeding areas during hog sorting of the left side pen in a one-room self-sorting hog facility.
Figure 5:
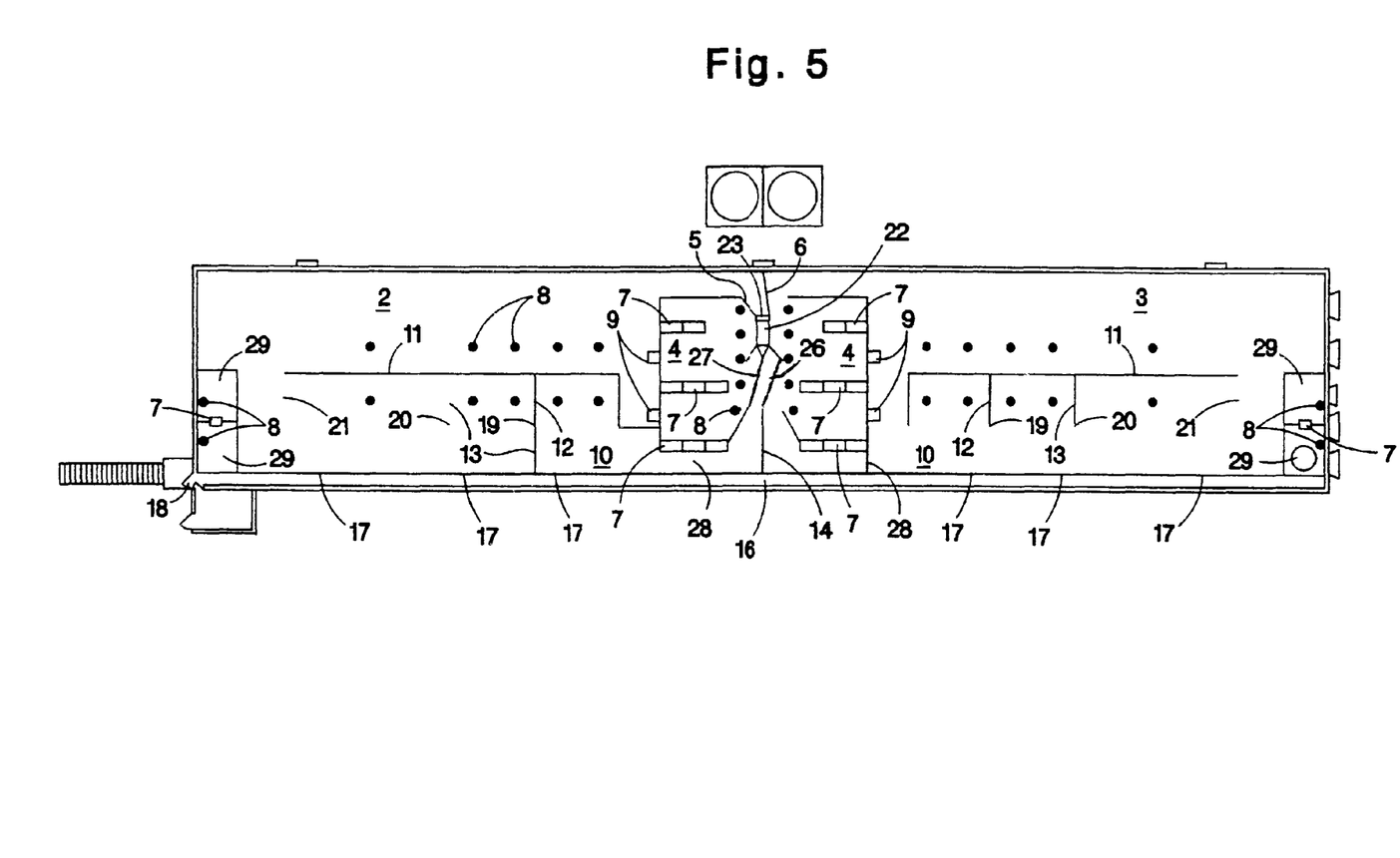
FIG. 5 is an overhead view of an entire one-room self-sorting hog facility as configured during hog sorting of the left side pen.

Animals can remain in holding area 10 until market truck pickup, while, on a second day, pen 2 is sorted in the same way. This is accomplished through reversing the gating layout as depicted in FIG. 4 and FIG. 5, using the same removable gates. Gates 5 and 6 are positioned so that the hogs can only enter feeding area 4 of pen 2 by crossing electronic sorting scale 22, with gate 23 now removed. Gate 26 is now secured between gates 32 and 14, while gate 27 is secured between the rear tip of scale 22 and gate 33. It is desired for gates 5 and 6 to be positioned in the entrance positions to the scale 22 and gates 33 or 34 be in the open position for at least a few hours prior to a sorting operation so that the hogs can become accustomed to passing through the scale to reach the feeding areas via the scale. The hogs will then continue passing through the scale in an attempt to reach the feeding troughs the next time they are hungry and will in effect sort themselves if the scale is an automatic scale.

As in sorting of pen 3, upon single file entrance onto scale 22, hogs are weighed and determined to be either "heavy" or "light." If designated as "heavy," gate 15 pivots, to allow access to opening 25, forcing the animal to travel down the corridor formed by the placement of gates 26 and 27, and into holding area 10 in pen 2, which has previously been adjusted to hold hogs in position 19, 20 or 21. These hogs now have access to one side of a feeder row 7 and one row of waterers 8, allowing the producer complete and exclusive control over this "heavy" group of market hogs' diet. Such hogs in holding area 10 can also be held off of feed completely through the placement of gate 28 at the entrance to holding area 10.

If a hog is designated as "light" upon entrance to scale 22, referenced in FIGS. 4 and 5, gate 15 pivots, to allow access to opening 24 and back into the normal feeding area 4 in pen 2, minus the holding pen feeder row side. The hog can now exit via one-way gates 9 back into pen 2, and continue with normal growing, feeding and watering habits until being deemed "heavy" during a future sorting.

When one or both pens 2 and 3 have been sorted into holding pens 10, and the market truck arrives, "heavy weight" hogs exit the room through gates 17 and enter alleyway 16, which runs the length of the room. The hogs are then herded down alleyway 16 exiting through door 18 and entering the market truck. The room is now reconfigured so that the gates are in the positions shown in FIG. 1, so that normal growing conditions will continue until the next market shipment is due. Each removable free-standing gate being held upright through the support of telescoping poles at each end.

Through this method, hogs are able to sort themselves, with the producer taking responsibility only for scale settings and gate configurations, with the capability of sorting one pen per day in a one-room self-sorting hog facility.

Figure 6:
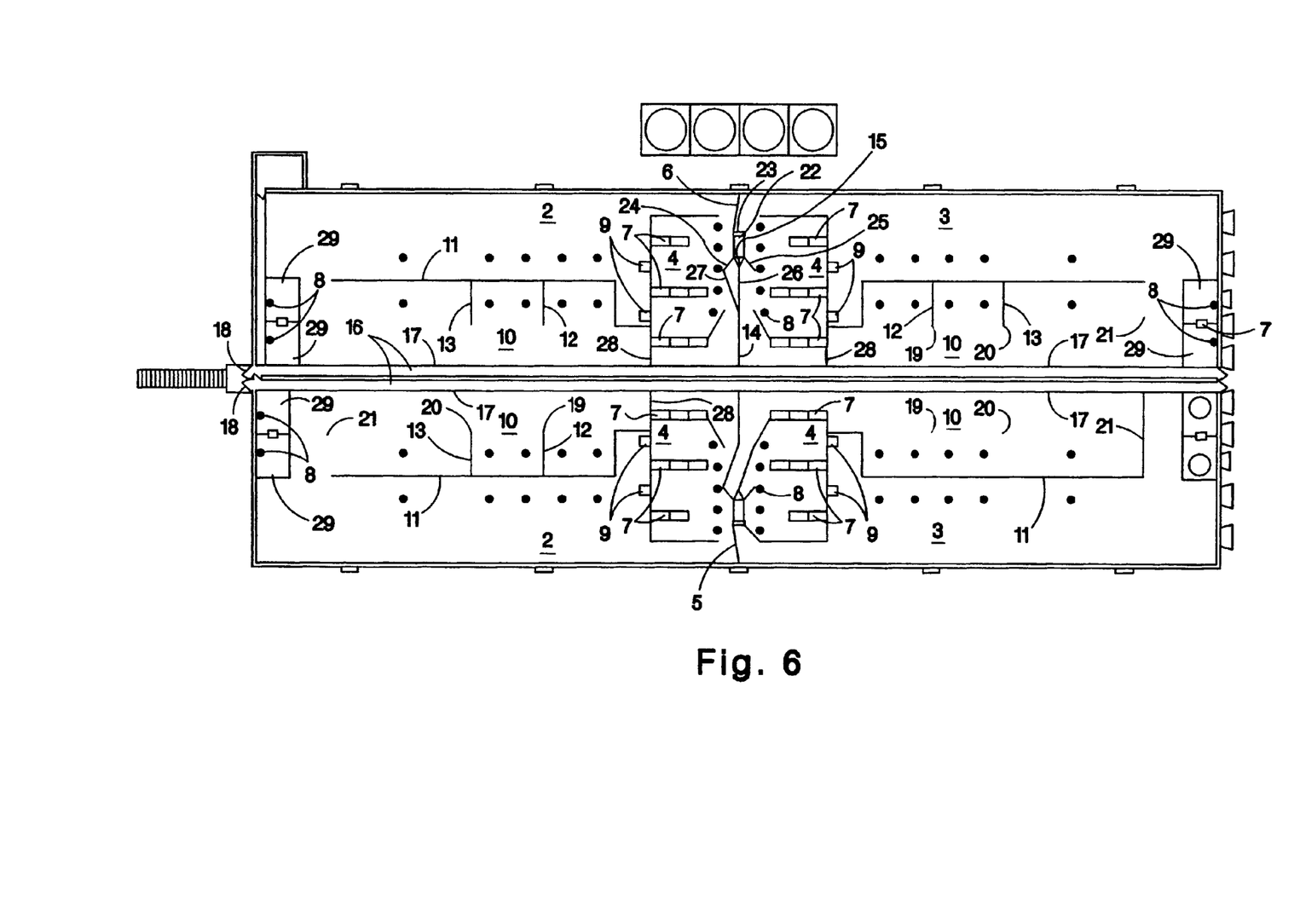
FIG. 6 is an overhead view of an entire two-room self-sorting hog facility, with the uppermost room during normal growing conditions, and the lowermost room during hog sorting of the right pen.

As depicted in FIG. 6, more than one pen can be sorted in one day through the construction of a multi-room self-sorting hog facility. While FIG. 6 illustrates two such sorting facilities, it should be evident that three or more identical facilities can be situated side-by-side, thereby even further increasing the number of hogs which can be finished or sorted in a given day.

As will be evident from the above, the present invention by its special hog sorting arrangement allows the use of a single automatic hog sorting scale device to sort large numbers of market weight hogs from under weight hogs and confine the market weight hogs under minimum feed conditions, while under weight hogs are returned immediately to self feeding conditions. Large numbers of hogs can thus be caused to sort themselves with minimum attention and labor.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

Having described the invention, I claim:

1. An automated hog finishing building comprising:
   (a) a pair of side walls and end walls joined to the side walls to form an enclosure;
   (b) a roof covering said enclosure;
   (c) a feeding area located centrally within said enclosure;
   (d) a pen area positioned around a major portion of the periphery of said feeding area;
   (e) means for partitioning said building enclosure such as to separate the feeding area and pen area into at least two separate but adjacent pen and feeding areas along a line between the side walls of said enclosure;
   (f) a device for weighing and sorting hogs having at least one downstream gate movable in accordance with the measured weight of said hogs to provide access to one of at least two alternative gate exits from said weighing and sorting device;
   (g) barrier means to divide at least one portion of said feeding area and pen area of at least one of said separate interconnected pen and feeding areas into a holding area with one of the two alternative gate exits of the weighing and sorting device leading to the holding area and the other to the remainder of the feeding area; and
   (h) the device for weighing and sorting being positioned between the two pen and feeding areas such as to be usable for weighing and sorting hogs alternatively in either of the two separate but adjacent pen and feeding areas.

2. An automated hog finishing building in accordance with claim 1 wherein the device for weighing and sorting hogs comprises a portion of the means for partitioning the building enclosure into at least two separate interconnected pen and feeding areas.

3. An automated hog finishing building in accordance with claim 2 wherein there are multiple pairs of two separate but adjacent pen and feeding areas with a device for weighing and sorting hogs disposed between them and alternatively usable for sorting hogs within one of each of said pairs.

4. An automated hog finishing building in accordance with claim 1 wherein a separate sick pen area is provided within at least one pen area.

5. An automated hog finishing building in accordance with claim 1 additionally comprising an alleyway along one of the side walls of said building enclosure, said holding area being accessible to the alleyway so that hogs can be herded through the opening out of the holding area, down the alleyway and into a vehicle for transportation to market.

6. An automated hog finishing building in accordance with claim 1 wherein each of said pen areas is capable of accommodating at least 400 hogs for growing.

7. An automated hog finishing building in accordance with claim 1 wherein access to said feeding area can be restricted by positioning gates around said feeding area so that the only way for accessing said feeding area is through the weighing and sorting device.

8. An automated hog finishing building in accordance with claim 1 wherein if the weight of a hog, as measured by the weighing and sorting device, is above a predetermined weight, a downstream gate of such device is swung so that the hog is directed into the holding area being serviced.

9. An automated hog finishing building in accordance with claim 1 wherein if the weight of a hog, as measured by the weighing and sorting device, is below a predetermined weight, a downstream gate is swung so that the hog is directed into the feeding area being serviced.

10. An automated hog finishing building in accordance with claim 1 wherein the feeding area contains a plurality of horizontal feeder rows and waterers, as well as a one-way exit gate leading from the feeding area back to the pen area.

11. An automated hog finishing building in accordance with claim 1 wherein said weighing and sorting device is located between and to one side of the feeding areas of one pair of separate but adjacent pen and feeding areas.

12. An automated hog finishing building in accordance with claim 11 wherein said weighing and sorting device sorts hog automatically.

13. An automated building for housing, feeding and sorting market hogs in large pen environments comprising one or more one-room, two-pen facilities, each pen having a living area and a feeding area, a portion of which feeding area and living area can be partitioned for use as a holding area when sorting hogs for market, and a single electronic sorting scale being provided for each room being positioned such that to provide a means for alternatively sorting hogs in each pen by weight, directing hogs ready for market into the holding area of the pen in question in preparation for market shipment, while hogs not ready to market are returned to the feeding and living area of the pen in question.

14. A building for housing, feeding and sorting market hogs as in claim 13 additionally comprising a sick pen area in each major pen.

15. A building for housing, feeding and sorting market hogs as in claim 14 additionally comprising an alleyway accessible from said holding area for each pen for leading hogs to a loading area for shipment to market.

16. A building for housing, feeding and sorting market hogs as in claim 15 wherein said holding area is formed in a portion of the living and feeding areas by a horizontal stationary fence, a removable and interchangeable gate positioned at a right angle between said horizontal stationary fence and the alleyway, said interchangeable gate being placed before sorting in one of three positions determining a quarter-truck, half-truck or whole-truck sort, another removable and interchangeable gate situated between the electronic sorting scale and a feeder row in said feeding area.

17. A building for housing, feeding and sorting market hogs as in claim 16 additionally comprising waterers positioned throughout the living area and feeding areas, with some of said waterers having a separate water supply exclusive to the holding area during sorting, thereby allowing for the addition of watered electrolytes to the sorted hogs' diet.

18. A building for housing, feeding and sorting market hogs as in claim 16 wherein each removable and interchangeable gate is held upright through the use of telescoping floor to ceiling poles.

19. A building for housing, feeding and sorting market hogs as in claim 13 wherein hogs can move freely between the feeding area and living area in each pen under normal growing conditions without passing through the electronic sorting scale but can be directed through the scale from either pen by manually placed gates.

20. A building for housing, feeding and sorting market hogs as in claim 19 wherein access between the living area and feeding area is restricted during sorting conditions by a feeding area gating/fencing system situated between said living and feeding areas, at least a portion of which is comprised of pivotable gates, so that hogs must pass through the electronic sorting scale to access the feeding area of the pen involved.

21. A building for housing, feeding and sorting market hogs as in claim 20 wherein interchangeable gates are used to form a corridor for "heavy" hogs exiting the electronic sorting scale to enter the holding area of the pen involved.

22. A building for housing, feeding and sorting market hogs as in claim 19 additionally comprising one or more one-way gates situated in the partition between the feeding area and living area of each pen, said one-way gates allowing hogs to pass from the feeding area to the living area, but not vise versa so that access to the feeding area is only through the scale positioned between pens.

23. A building for housing, feeding and sorting market hogs as in claim 19 additionally comprising a gate covering the entrance to the electronic sorting scale when sorting is not taking place.

24. A building for housing, feeding and sorting market hogs as in claim 13 wherein said means for alternatively sorting hogs based on weight comprises at least one diversion gate, said diversion gate being pivotable between one of two positions so that "heavy" hogs are directed to the holding area, and "light" hogs are directed back to feeding and living areas.

25. A method of sorting at least one hog selected from a plurality of hogs in a hog finishing building using a single electronic sorting scale, said building being partitioned into two separate pens each having a living area and centrally located feeding areas adjacent each other with the scale positioned along the dividing line between pens, comprising the steps of:

configuring a separate holding area within a portion of the living area and feeding area of the first pen using removable and interchangeable gates;

blocking access to the feeding area from the living area of the first room other than by passing through the electronic sorting scale;

allowing the hogs to pass from the living area in the first pen into the electronic sorting scale, wherein the weight of the hogs is measured against a predetermined market weight, and wherein if the weight of the hog is at or above the predetermined market weight a diversion gate herds the hog to the holding area, and if the weight of a hog is below the predetermined market weight the hog the diversion gate herds the hog into the feeding area.

26. The method of sorting hogs in accordance with claim 25 comprising the additional steps of:

reconfiguring the gates in the first pen to their position during normal growing conditions;

configuring a separate holding area within a portion of the living area and feeding area of the second pen using removable and interchangeable gates;

blocking access to the feeding area from the living area of the second room other than by passing through the electronic sorting scale;

allowing the hogs to pass from the living area of the second pen into the electronic sorting scale, wherein the weight of the hogs is measured against a predetermined market weight, and wherein if the weight of a hog is at or above the predetermined market weight a diversion gate herds the hog to the holding area, and if the weight of a hog is below the predetermined market weight the hog the diversion gate herds the hog into the feeding area.

27. The method of sorting hogs in accordance with claim 25 comprising the additional step of:

providing hogs in the holding area of at least one pen with a waterer containing watered electrolytes.

28. A pig finishing facility comprising:
(a) a single open area within a building under cover of a roof and having a slotted floor to facilitate waste removal,
(b) said open area being divided into at least two principal areas adjacent each other at one location,
(c) an automatic sorting scale positioned between the two principal pen areas,
(d) each pen area being provided with a feeding area containing feeding means and a principal living area,
(e) portable gates arrangeable with respect to each principal pen to direct pigs during an acclimation period through the sorting scale while not operational from the living area of a pen to the feeding area of the pen and while the scale is operational from the scale to either the feeding area of the pen or the living area of the pen while the two feeding and pen areas are blocked off from each other by appropriately arranged gates,
(f) the automatic sorting scale being usable alternatively for passage of pigs from either principal pen with suitable movable gates by reason of its control location between principal pens.

29. A pig finishing facility in accordance with claim 28 wherein the feeding area of each principal pen is adjacent to the feeding area of the other principal pen and the pen areas are substantially mirror images of each other so that the same portable gates can be used in similar arrangements to guide pigs when sorting in either pen by means of the automatic sorting gate.

30. A pig finishing facility in accordance with claim 28 wherein the open area within such facility is sufficiently large to contain at least one multiple of the two principal pens, each pair of principal pens having an automatic self sorting scale positioned between them and sufficient movable gate means to sort pigs in either of the two principal pens.

* * * * *